(12) United States Patent
Braysy

(10) Patent No.: US 11,694,129 B2
(45) Date of Patent: Jul. 4, 2023

(54) PARALLEL SOLUTION GENERATION

(71) Applicant: Procomp Solutions Oy, Oulu (FI)

(72) Inventor: Olli Braysy, Suolahti (FI)

(73) Assignee: PROCOMP SOLUTIONS OY, Oulu (FI)

(*) Notice: Subject to any disclaimer, the term of this patent is extended or adjusted under 35 U.S.C. 154(b) by 1720 days.

(21) Appl. No.: 14/917,542

(22) PCT Filed: Sep. 22, 2014

(86) PCT No.: PCT/FI2014/050723
§ 371 (c)(1),
(2) Date: Mar. 8, 2016

(87) PCT Pub. No.: WO2015/040282
PCT Pub. Date: Mar. 26, 2015

(65) Prior Publication Data
US 2016/0217402 A1 Jul. 28, 2016

(30) Foreign Application Priority Data
Sep. 23, 2013 (FI) ....................... 20135946

(51) Int. Cl.
*G06Q 10/06* (2023.01)
*G06Q 10/04* (2023.01)
(Continued)

(52) U.S. Cl.
CPC ......... *G06Q 10/06311* (2013.01); *G06F 9/44* (2013.01); *G06F 9/5066* (2013.01); *G06Q 10/047* (2013.01); *G06Q 10/0633* (2013.01)

(58) Field of Classification Search
CPC ......... G06Q 20/40145; G06Q 20/4014; G06Q 10/047; G06Q 10/06; G06Q 10/083;
(Continued)

(56) References Cited

U.S. PATENT DOCUMENTS 7,239,962 B2 * 7/2007 Plutowski .......... G01C 21/3415
340/995.11
7,840,319 B2 * 11/2010 Zhong .................... G06Q 10/08
701/25
(Continued)

OTHER PUBLICATIONS

Groer, "A Parallel Algorithm for the Vehicle Routing Problem," Informs Journal on Computing, vol. 23(2), pp. 1-32 (May 1, 2011).*
(Continued)

*Primary Examiner* — Jamie H Austin
(74) *Attorney, Agent, or Firm* — Fisherbroyles, LLP

(57) ABSTRACT

The application describes parallel solution generation. A data processing apparatus includes a memory including a computer program code, and at least two processors configured to execute the computer program code. The computer program code includes a component program run in parallel on at least two processors to generate solution components compiled in parallel of points, and to store the added solution components in the memory; and a solution program run in parallel on at least two processors to generate a solution by adding one solution component at a time, read from the memory, to the solution based on a key point, and to store the added solution component to the solution in the memory.

19 Claims, 17 Drawing Sheets

(51) Int. Cl.
*G06Q 10/0631* (2023.01)
*G06F 9/50* (2006.01)
*G06Q 10/047* (2023.01)
*G06F 9/44* (2018.01)
*G06Q 10/0633* (2023.01)

(58) Field of Classification Search
CPC .... G06Q 30/02; G06Q 30/0241; G06Q 10/00; G06Q 10/04; G06Q 10/0631; G06Q 10/08; G06Q 10/08355; G06Q 10/087; G06Q 10/10; G06Q 10/103; G06Q 20/02; G06Q 20/023; G06Q 20/04; G06Q 20/10; G06Q 20/12; G06Q 20/123; G06Q 20/1235; G06Q 20/24; G06Q 20/401; G06Q 30/0601; G06Q 40/04; G06Q 50/24; G06Q 20/389
See application file for complete search history.

(56) References Cited

U.S. PATENT DOCUMENTS

| | | | | |
|---|---|---|---|---|
| 2006/0098017 | A1* | 5/2006 | Tarditi | G06F 8/45 345/505 |
| 2006/0224423 | A1* | 10/2006 | Sun | G06Q 10/0631 705/7.12 |
| 2008/0084423 | A1* | 4/2008 | Bakalash | G06T 15/005 345/505 |
| 2010/0106539 | A1* | 4/2010 | Kenefic | G06Q 10/063 705/7.26 |
| 2012/0179674 | A1 | 7/2012 | Delling et al. | |
| 2013/0096815 | A1* | 4/2013 | Mason | G08G 1/20 701/400 |
| 2014/0229101 | A1* | 8/2014 | Glaser | G01C 21/3614 701/487 |

OTHER PUBLICATIONS

Nagata "A Powerful Route Minimization Heuristic for the Vehicle Routing Problem with Time Windows," Operations Research Letters 37, pp. 333-338 (Sep. 1, 2009) (Year: 2009).*

Groer, "A Parallel Algorithm for the Vehicle Routing Problem," Informs Journal on Computing, vol. 23(2), pp. 15-330 (May 1, 2011) (Year: 2011).*

Ngamchai, Somnuk, and David J Lovell. "Optimal Time Transfer in Bus Transit Route Network Design Using a Genetic Algorithm." Journal of Transportation Engineering 129.5 (2003): 510-521. (Year: 2003).*

Groer, "A Parallel Algorithm for the Vehicle Routing Problem," Informs Journal on Computing, vol. 23(2), pp. 1-32 (May 1, 2011). (Year: 2011).*

Schulz et al., "GPU computing in discrete optimization. Part II: Survey focused on routing problems", EURO Journal on Transportation and Logistics, vol. 2, No. 1-2, Apr. 24, 2013 (Apr. 24, 2013), pp. 159-186.

European Office Action issued in European Application No. 14802698.2 dated Aug. 24, 2018.

Braysy, "A Multi-start Local Search Algorithm for the Vehicle Routing Problem with Time Windows," European Journal of Operations Research 159, pp. 586-605 (Oct. 8, 2003).

Nagata "A Powerful Route Minimization Heuristic for the Vehicle Routing Problem with Time Windows," Operations Research Letters 37, pp. 333-338 (Sep. 1, 2009).

Groer, "A Parallel Algorithm for the Vehicle Routing Problem," Informs Journal on Computing, vol. 23(2), pp. 315-330 (May 1, 2011).

Crainic, et al., "Parallel Meta-Heuristics," In Reports of CIRRELT, University of Montreal, Canada, pp. 1-53 (May 1, 2009).

INFORMS Journal on Computing, Table of Contents, vol. 23, Issue 2, 3 pages (Spring 2011).

International Search Report and Written Opinion, Application No. PCT/FI2014/050723, 18 pages (dated Jan. 29, 2015).

Search Report, Application No. FI 20135946,1 page (dated May 5, 2014).

Search report and Office Action issued by the Chinese National Intellectual Property Administration in relation to corresponding Chinese Patent Application No. 2014800523252 dated Feb. 27, 2019, 75 pgs.

Groër C. et al., "A Parallel Algorithm for the Vehicle Routing Problem," INFORMS Journal on Computing 2011, vol. 23, No. 2, 32 pgs (DOI: 10.1287/ijoc.1100.0402).

Groër C. et al., "Online Supplement for a Parallel Algorithm for the Vehicle Routing Problem," Informs Journal on Computing, Dec. 31, 2011, 29 pgs.

First Office Action received for Canadian Patent Application Serial No. 2,962,139 dated Nov. 25, 2020, 5 pages.

Second Office Action received for Canadian Patent Application Serial No. 2,962,139 dated Oct. 8, 2021, 4 pages.

Office Action received for Finnish Patent Application No. 20135946 dated Sep. 7, 2021, 8 pages.

Wikipedia, "General-purpose computing on graphics processing units", URL: https://web.archive.org/web/20130610012115/https://en.wikipedia.org/wiki/ General-purpose_computing_on_graphics_processing_units, retrieved on Aug. 27, 2021, 14 pages.

* cited by examiner

PARALLEL SOLUTION GENERATION

CROSS-REFERENCE TO RELATED APPLICATIONS

This application is a National Stage application of International Application No. PCT/FI2014/050723, filed Sep. 22, 2014, which claims priority to Finnish Application No. FI 20135946, filed Sep. 23, 2013, which are incorporated by reference herein in their entirety.

BACKGROUND

Field

The invention relates to a data processing apparatus and a computer program code, which are used to generate a parallel solution.

Description of the Related Art

Massive parallel computing has risen to become the central factor in boosting the power and speed of optimization. In this regard, the utilization of both the CPU and GPU technologies (Central Processing Unit/Graphics Processing Unit) play important roles. The challenge is that the current optimizing methods, in particular in the case of NP-hard (Non-deterministic Polynomial-time hard) discrete optimization problems, are poorly suited to massive parallel computing. In addition, the optimization of realistic practical problems is challenging by complex improvement heuristics and the maintenance of these methods is laborious.

Based on what was noted in the above, various kinds of methods that are based on partitioning, such as set covering and set partitioning, are a logical choice. In them, when optimizing routes, for example, first a set of routes or parts thereof are created, and then the created routes are combined into a solution either exactly of heuristically.

Some research exists on utilizing GPU for optimization. GPU has been used to distribute parts of the work to be performed between different processors. In practice, the evaluation of moves has been done with the aid of GPU. An evaluation always needs to be carried out with respect to a reference point, that is, whenever an improving move is found, evaluations must be interrupted, the reference point updated, and started from the beginning. Because the update is a arduous operation, the GPUs are in a wait state most of the time. Therefore, the obtained speed advantages are marginal. Some attempts have been made into making the evaluations proportionately more complex and/or updating operations proportionately lighter, whereby there would be less wait time for the processors, but, in pursuance of this, time is wasted on inefficient computing.

The fundamental problem of the set covering methods is that generating compatible and at the same time efficient and different enough routes is immeasurably challenging, if the routes are built independently/in parallel. This results in that to compile a good solution, the quantity of the built individual routes needs to be really high, which becomes a challenge despite the boost in computing power.

SUMMARY

The present invention seeks to provide an improved data processing apparatus and an improved computer program code.

According to an aspect of the present invention, there is provided a data processing apparatus for route optimization in logistics, or planning work shifts, or planning of production, the data processing apparatus comprising a memory including a computer program code, and at least two processors, which are configured to execute the computer program code, wherein the first processor comprises a microprocessor or a processor core, and the second processor comprises a graphics processor, and said computer program code comprises a component program run on at least two processors and a solution program run in parallel on at least two processors, wherein the computer program code, when run on at least two processors causes the data processing apparatus to perform at least the following: the component program forms solution components compiled of points in parallel, and stores the formed solution components in the memory so that a copy of the formed solution components is stored in an own memory of a graphics card implementing the graphics processor, wherein the solution components comprise individual routes and/or parts of individual routes, or the solution components comprise individual work shifts and/or parts of individual work shifts, or the solution components comprise usage plans for individual machines; and the solution program generates a solution by adding one solution component in order at a time, read from the memory, to the solution based on a key point so that corrective operations including removals, additions and replacements are carried out heuristically leaning on the key points, whereby it is not necessary to examine all possible combinations, and to store the added solution component to the solution in the memory, wherein the key points are obtained by defining unrouted points, and the solution comprises a compatible set of routes for a predetermined area and/or time period, or the key points are obtained by defining both temporally and regionally the closest point in relation to the points already selected, and the solution comprises a compatible set of works shifts allocated to employees for predefined physical locations and/or time period, or the key points are obtained on the basis of the similarity between the resource or time requirements of work tasks, and the solution comprises a comprehensive production plan for a predetermined time period.

According to another aspect of the present invention, there is provided a non-transitory computer-readable medium storing a computer program code for route optimization in logistics, or planning work shifts, or planning of production, by a data processing apparatus comprising at least two processors, which are configured to execute the computer program code, wherein the first processor comprises a microprocessor or a processor core, and the second processor comprises a graphics processor, and said computer program code comprises a component program run on at least two processors and a solution program run in parallel on at least two processors, wherein the computer program code, when run on at least two processors causes the data processing apparatus to perform at least the following: the component program forms solution components compiled of points in parallel, and stores the formed solution components in the memory so that a copy of the formed solution components is stored in an own memory of a graphics card implementing the graphics processor, wherein the solution components comprise individual routes and/or parts of individual routes, or the solution components comprise individual work shifts and/or parts of individual work shifts, or the solution components comprise usage plans for individual machines; and the solution program generates a solution by adding one solution component in order at a time, read from the memory, to the solution based on a key point so that corrective operations including removals, additions and replacements are carried out heuristically leaning on the key points, whereby it is not necessary to examine all possible combinations, and to store the added solution component to the solution in the memory, wherein the key points are obtained by defining unrouted points, and the solution comprises a compatible set of routes for a predetermined area and/or time period, or the key points are obtained by defining both temporally and regionally the closest point in relation to the points already selected, and the solution comprises a compatible set of works shifts allocated to employees for predefined physical locations and/or time period, or the key points are obtained on the basis of the similarity between the resource or time requirements of work tasks, and the solution comprises a comprehensive production plan for a predetermined time period.

The advantages of the invention at least include excellent support for massive parallel computing and diverse models, as well as its universality and feasibility. Because the combining is performed in order one component at a time, it is immediately apparent what the best selection is or whether the selected path of combining is worth continuing.

BRIEF DESCRIPTION OF THE DRAWINGS

Embodiments of the invention will be described below by way of example, referring to the attached drawings, of which.

DETAILED DESCRIPTION

The embodiments to be disclosed next are merely examples. The invention is not restricted to the disclosed embodiments but they are examples of feasible ways of implementation. Features of various embodiments may also be combined unless they are specifically conflicting or alternative with regard to their technical implementation. The word "comprising" means that the disclosed embodiment includes the features referred to, but there may be additional features, too, that are not mentioned. It should be noted that the Figures present simplified block diagrams in which only the essential features from the viewpoint of the embodiments are described; a person skilled in the art will find it obvious that the data processing apparatus may include many other features and structures, too. However, such other parts may be irrelevant in regard of the actual invention, and thus there is no need to discuss them in greater detail here. Further, it is to be noted that although the elements are described as being separate, some of them may be integrated into one physical element, i.e. the elements described may be logical elements.

Figure 1:
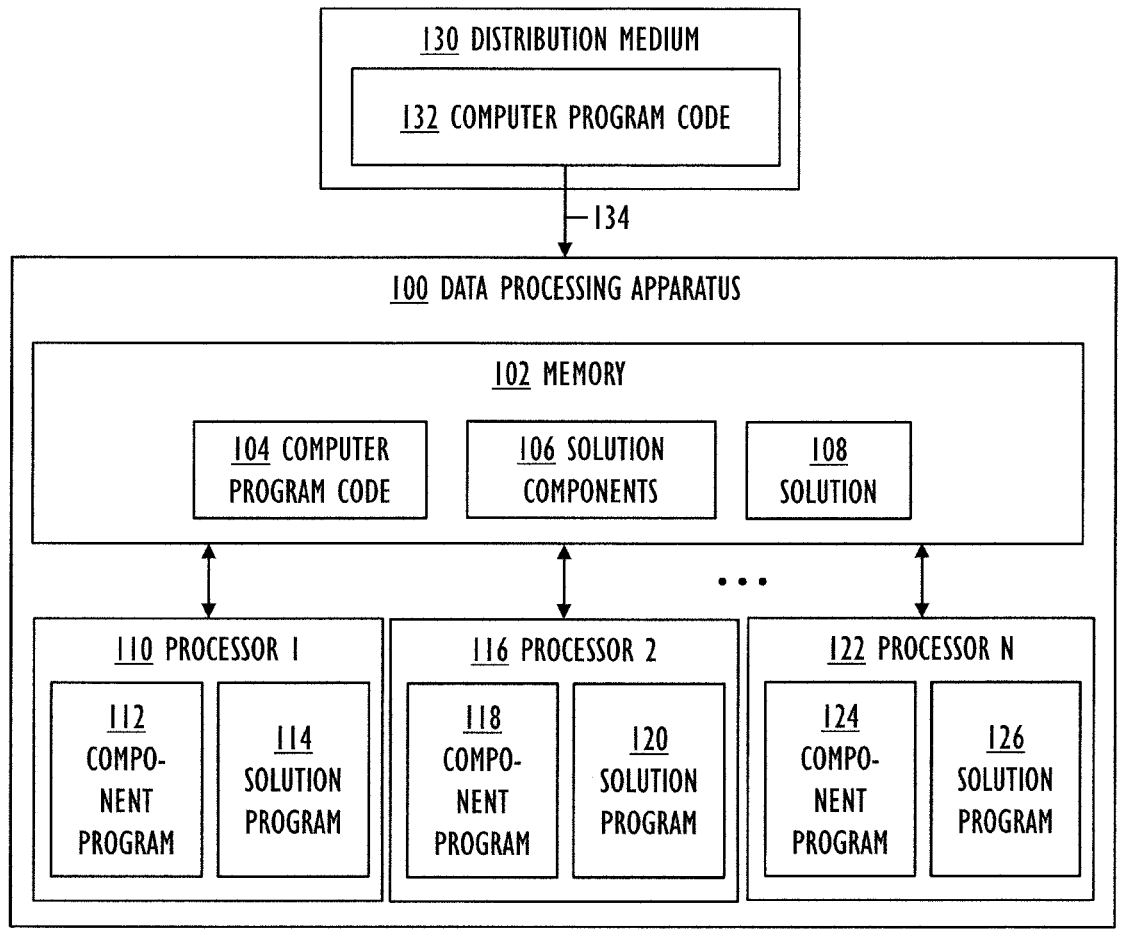
FIGS. 1, 2, 3, 4 and 5 show example embodiments of a data processing apparatus.

FIG. 1 describes a data processing apparatus 100, which comprises a memory 102 including a computer program code 104, and at least two processors 110, 116, which are configured to execute the computer program code 104.

The computer program code 104 comprises a component program 112, 118 run on at least two processors 110, 116 to form solution components 106 compiled of points in parallel, and to store the formed solution components 106 in the memory 102. In an example embodiment, the solution components 106 are not as such distributed between the processors 110, 116, but each processor 110, 116 has access to all the stored components 106. If the search times from the memory 102 become too high as a result of overlaps, the required number of copies may be made of the solution components 106. Because the memory requirements are small, this can be done. The identifier of the component library 106 may be distributed between the processors 110, 116. The solution components may be formed 106 according to predetermined rules: if the solution component is, for example, a distribution route, it is possible to determine, for example, the maximum length and time for the route, or the maximum number of points, so as not to exceed the driving time allowed by the collective labour agreement.

In addition, the computer program code 104 comprises a solution program 114, 120 run in parallel on at least two processors 110, 116 to generate a solution 108 by adding one solution component 106 at a time, read from the memory 102, to the solution 108 based on a key point, and to store the added solution component 106 to the solution 108 in the memory 102. With the aid of a key point, solution components 106 close to one another may be defined. In an example embodiment, a key point is selected that already has the lowest placing cost in relation to the solution component 106 already selected to the solution 108. In an example embodiment, a key point is selected which belongs to the first suitable solution component 106. In an example embodiment, a key point is selected which belongs to the best solution component 106 to be combined. In an example embodiment, a strategy of the look ahead type may potentially be used to anticipate the effect of the selection made and to conclude based on it what the best solution is: so, various kinds of potential chains of selections may be reviewed in the same manner as, for example, the effects of a move on future moves are pondered in chess. In an example embodiment, the solution component 106 containing the best key point determined according to some selection criterion is selected.

In an example embodiment, each processor 110, 116 generates a solution entirely independently, and they may hence have a lot of overlap. Each processor 110, 116 may independently construct a full solution. In an example embodiment, each processor 110, 116 may be assigned a different starting point, because the solution component 106 selected first has a major effect on the subsequently selected ones. The different starting point, that is, the first selected solution component, may be determined for each processor 110, 116 according to predetermined rules in such a manner, for example, that solution components 106 that are as far away as possible from each other are selected. Alternatively, the selection of the starting point for each processor 110, 116 may be carried out, for example, with a random number so that the selection algorithm is initialized for each processor 110, 116 by its own random number. The influence of randomness may also be expanded: one of the best options may be randomly selected at each stage as the subsequent solution component 106. Various kinds of improving moves may also be randomly performed at different stages. The solutions 108 produced by different processors 110, 116 need not be combined, only the solution components 106 as the solutions are being built 108. As the solution 108 is being formed, the combining is carried out just by updating the information structure included in the solution 108. So, at all times there may be a plurality of solutions 108 being made; in principle, each processor 110, 116 builds its own solution 108 or at least an independent part of the solution 108 by using the same solution components 106, whereby parallel updates present no problem.

If the processors 110, 116 make independent parts of the solution 108, the combining of the solution 108 may be facilitated in such a manner that the points are divided into separate subsets in advance, in other words, they do not overlap. In this case, combining is mainly a reporting technological issue. So, to take snow-ploughing as an example, where a town has been divided into three contract areas, for example, then each contract area is an independent part that has got nothing in common with the other areas. The snow-ploughing of the town then only consists of these contract areas that have been separately optimized.

If each of the processors 110, 116 makes its own perfect solution 108, more resources are obviously consumed than if only one solution 108 were being generated, but on the other hand, solving such difficult optimization problems is feeling one's way in the dark, anyway, in which substantial amount of work "goes down the drain." The best way to combine different kinds of good solution components 106 can only be found by trying out as many combinations as possible, and the example embodiments described allow that and utilize the computer power as much as possible. As the end result, either one solution 108 is obtained, with the best value for its target function, or then a set of best solutions 108 that are the best as measured with at least one indicator, and the user then selects the most suitable one for the purpose.

As seen in FIG. 1, there are at least two processors 110, 116, in other words, there may be more of them: as described in FIG. 1, there may be N pieces of processors 110, 116, 122, where N is an integer larger than two. Therefore, the solution program 114, 120, 126 may be run in parallel on more than two processors 110, 116, 122, up to as many as N processors 110, 116, 122. The component program 112, 118, 124 is also run on at least two processors 110, 116, 122, that is, it may be run on more, as many as N processors 110, 116, 122.

In an example embodiment, the first processor 110 comprises a microprocessor, processor core, or graphics processor, and the second processor 116 comprises a microprocessor, processor core, or graphics processor.

Figure 2:
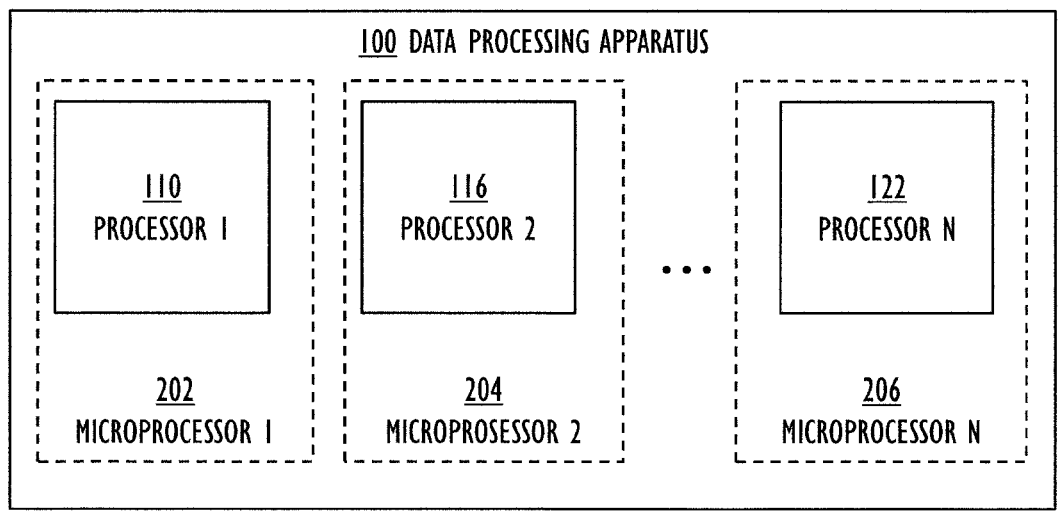

In the example embodiment of FIG. 2, the processors 110, 116, 122 are implements as microprocessors 202, 204, 206 whereby the component program 112, 118, 124 and the solution program 114, 120, 126 may be run in parallel on as many as N microprocessors 202, 204, 206.

Figure 3:
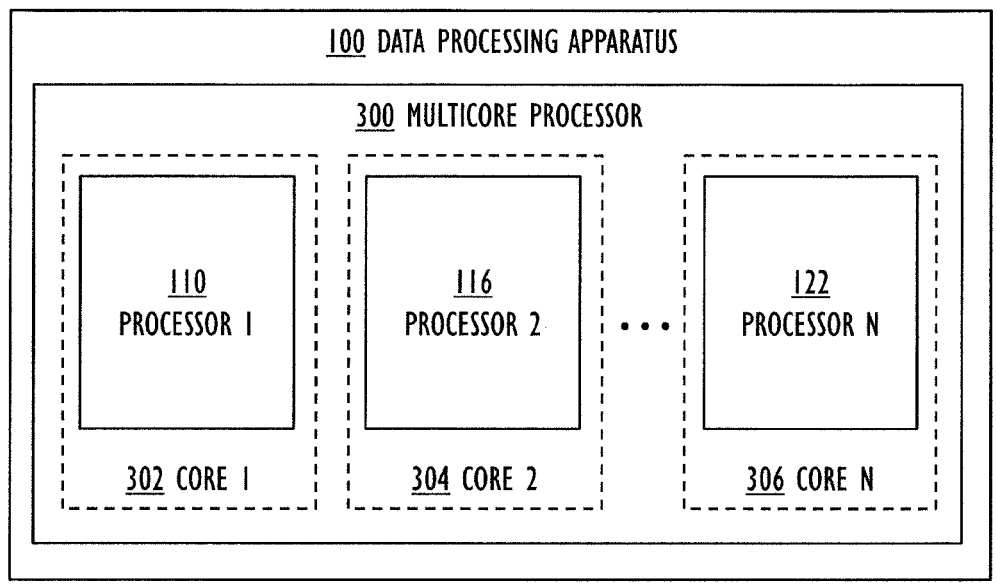

In the example embodiment of FIG. 3, the processors 110, 116, 122 are implemented as processor cores 302, 304, 306 of a multicore processor 300 whereby the component program 112, 118, 124 and the solution program 114, 120, 126 may be run in parallel on as many as N processor cores 302, 304, 306.

Figure 4:
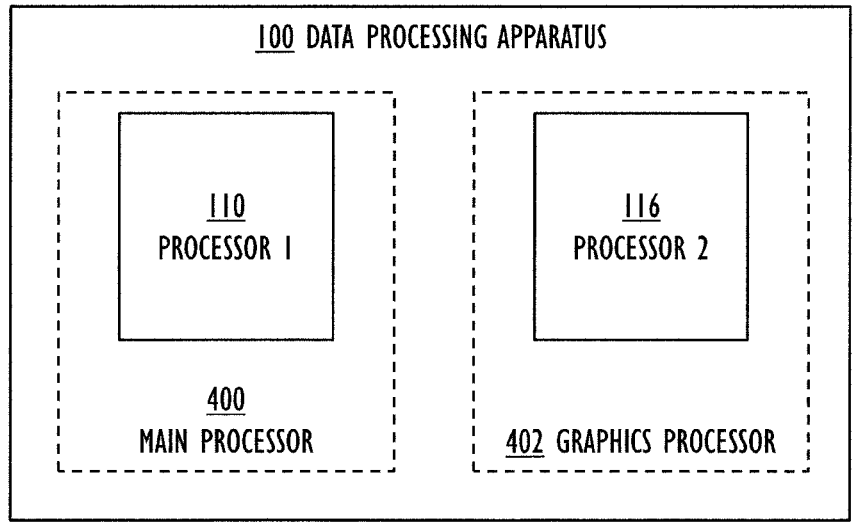

In the example embodiment according to FIG. 4, the processors 110, 116 are implemented as a central processing unit (CPU) 400 and graphics processing unit (GPU) 402, whereby the component program 112, 118 and the solution program 114, 120 may both be run in parallel on the CPU 400 and GPU 402. In an example embodiment, the main processing unit 400 is implemented as a microprocessor. The graphics processing units 402 may be implemented by using a separate graphics card. The graphics card may include a large number of graphics processing units 402, as many as three thousand, for example. In addition, a graphics card may have its own memory. In the memory of the graphics card, a copy of the solution components 106 may be stored, because the graphics processing unit 420 is as such powerful and the memory operations within the graphics card are fast, but data transfer in the direction of the main processing unit 400 is relatively slow.

On the basis of these example embodiments described in FIGS. 2, 3, and 4, various kinds of hybrid combinations may be formed.

Figure 5:
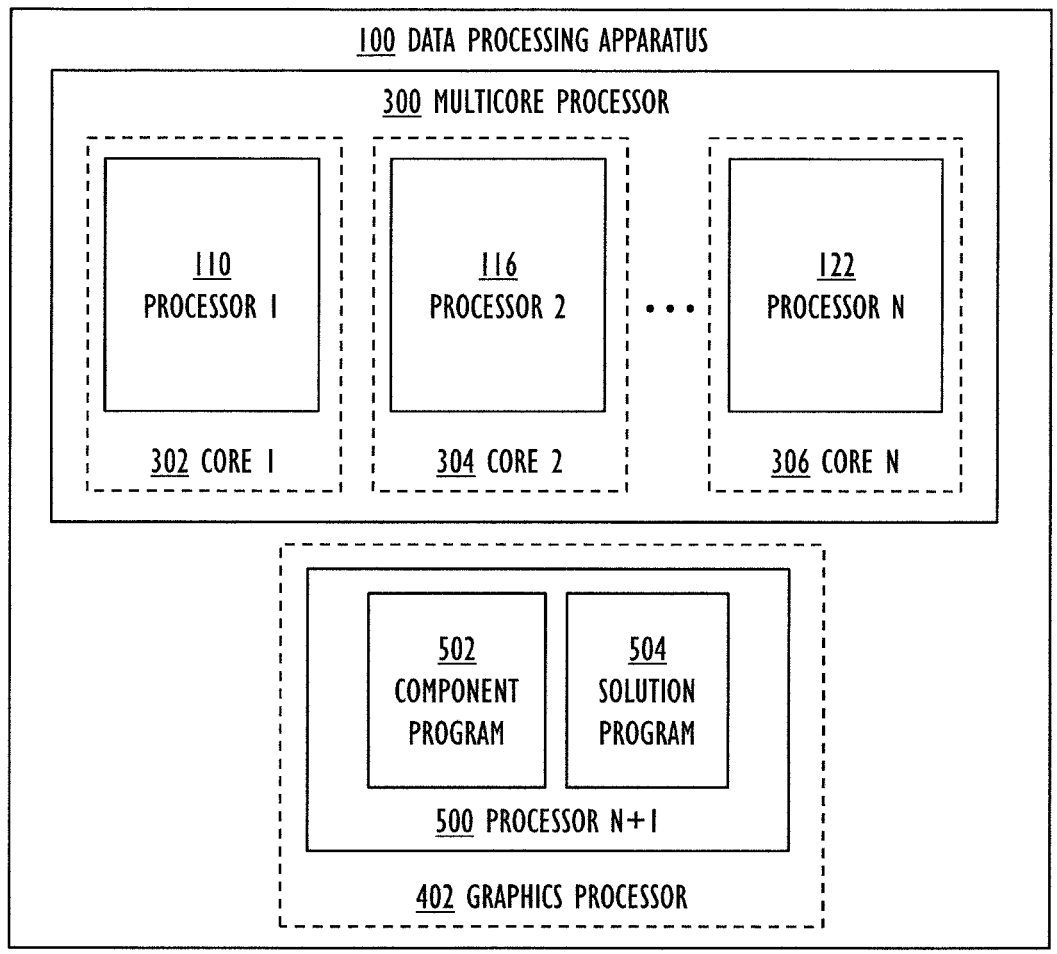

In the example embodiment of FIG. 5, the processors 110, 116, 122, 500 are implemented as processor cores 302, 304, 306 of a multicore processor 300 and as a graphics processing unit 302, whereby the component program 112, 118, 124, 502 and the solution program 114, 120, 126, 504 may be run in parallel on as many as N+1 processors 110, 116, 122, 500.

Generally, the processor 110, 116, 122 may be implemented as a microprocessor, graphics processing unit, processor core of a multicore processor, processor of a parallel processor, but also by using, either in addition to or instead of, at least one of the following: a standard integrated circuit, application-specific integrated circuit (ASIC), system-on-a-chip (SoC), application-specific standard product (ASSP), digital signal processor, or special-purpose computer chip.

In an example embodiment, the processor 110, 116, 122 is part of an electronic digital computer 100. The computer 100 may comprise a random access memory (RAM), a central processing unit (CPU) and a system clock. The central processing unit may comprise a number of registers, an arithmetic logic unit (ALU) and a control unit. The control unit is controlled by a sequence of program commands 104, which has been transferred to the central processing unit from the random access memory. The central processing unit may include a number of micro commands for basic operations. Implementation of the micro commands may vary depending on the design of the central processing unit. The program commands 104 may be encoded in a programming language, which may be high-level programming language, such as C or Java, or a lower-level programming language, such as a machine language or an assembler. The computer 100 may also have an operating system which may provide system services for a computer program 104 written by means of program commands. Referring to the description above, the CPU may be a microprocessor or a multicore processor, and the computer 100 may additionally comprise a graphics processing unit. Memory 102 may be random access memory, but the computer 100 may have non-volatile memory in which the computer program code 104 is stored. At the lowest level, information may be processed as bits (or qubits, if the computer is a quantum computer).

As described in FIG. 1, the computer program code 132 may be stored on a distribution medium 134 from which it is transferrable to the computer 100 whereby the computer program code 104, when run on at least two processors 110, 116, 122, forms the solution components 106, and when run on at least two processors 110, 116, 122, forms the solution 108. In an example embodiment, the computer program code 132, 104 may be in source code format, object code format, executable format, or in an in a transition format. The distribution medium 134 may comprise at least the following: any entity allowing program distribution, memory means, read-only memory, communications signal, non-transitory computer-readable storage means.

Figure 6:
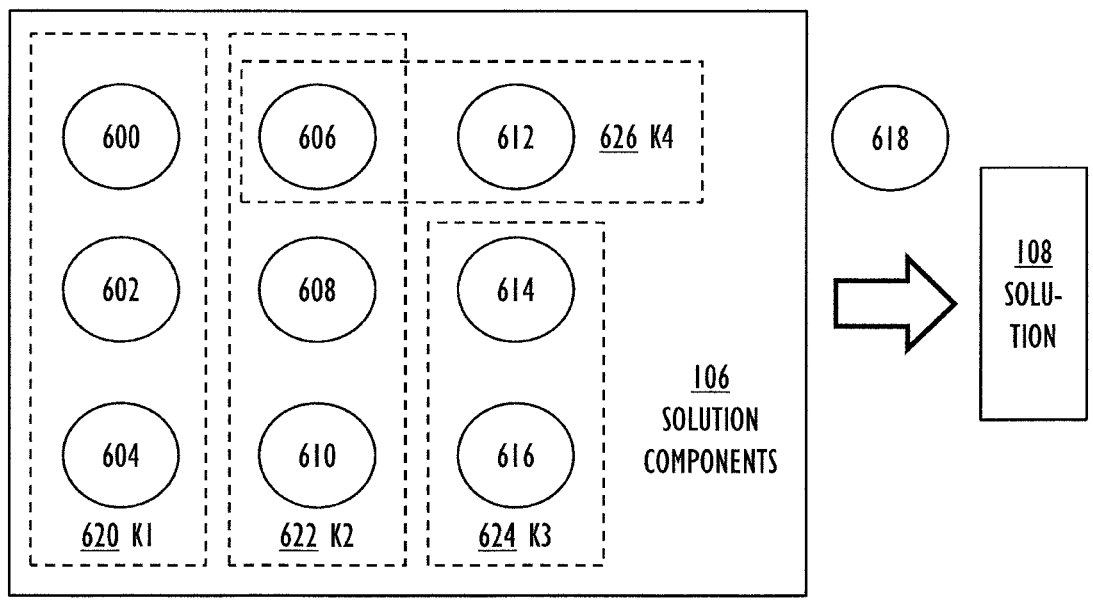
FIGS. 6, 7 and 8 show example embodiments of solution components and a solution.
Figure 7:
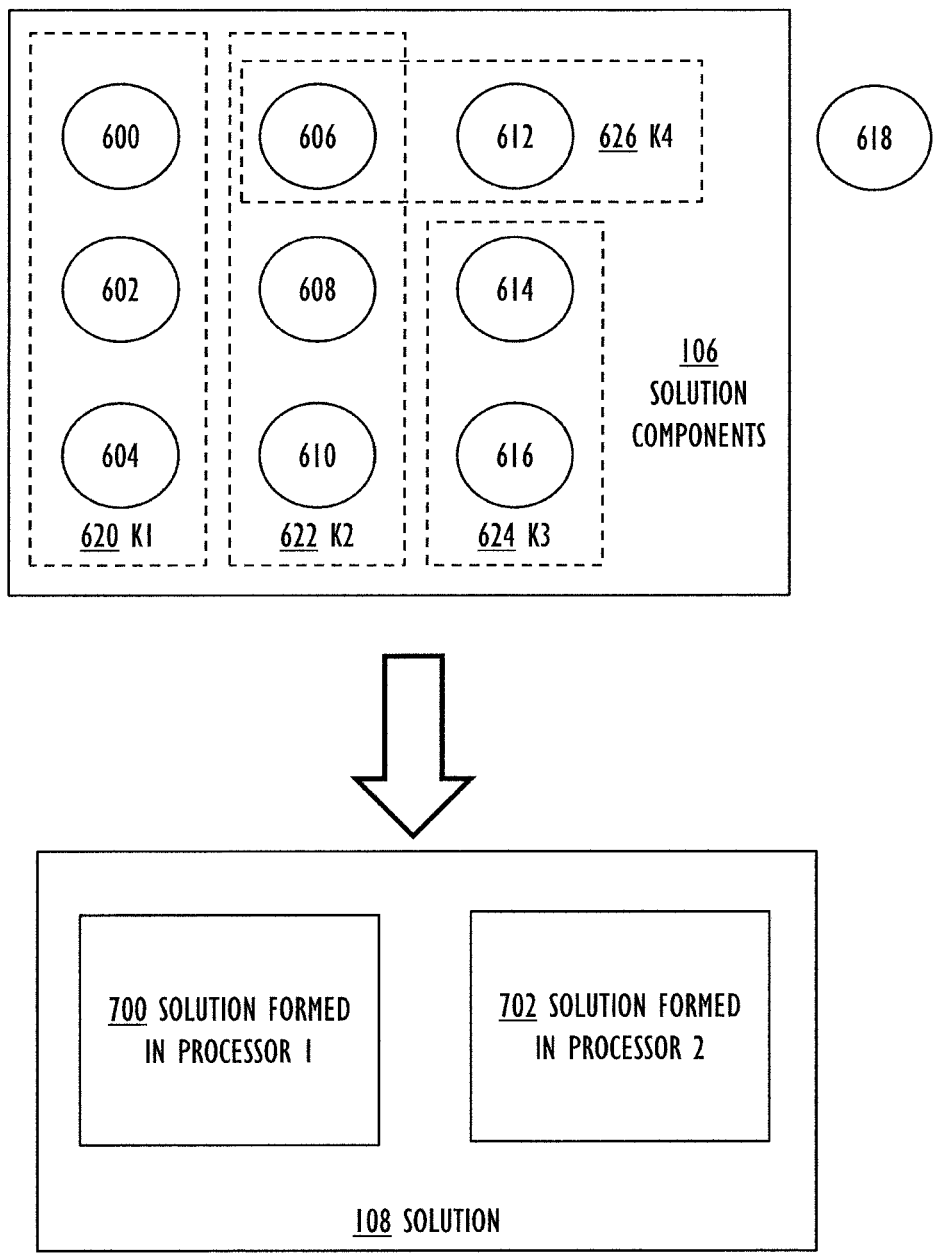
Figure 8:
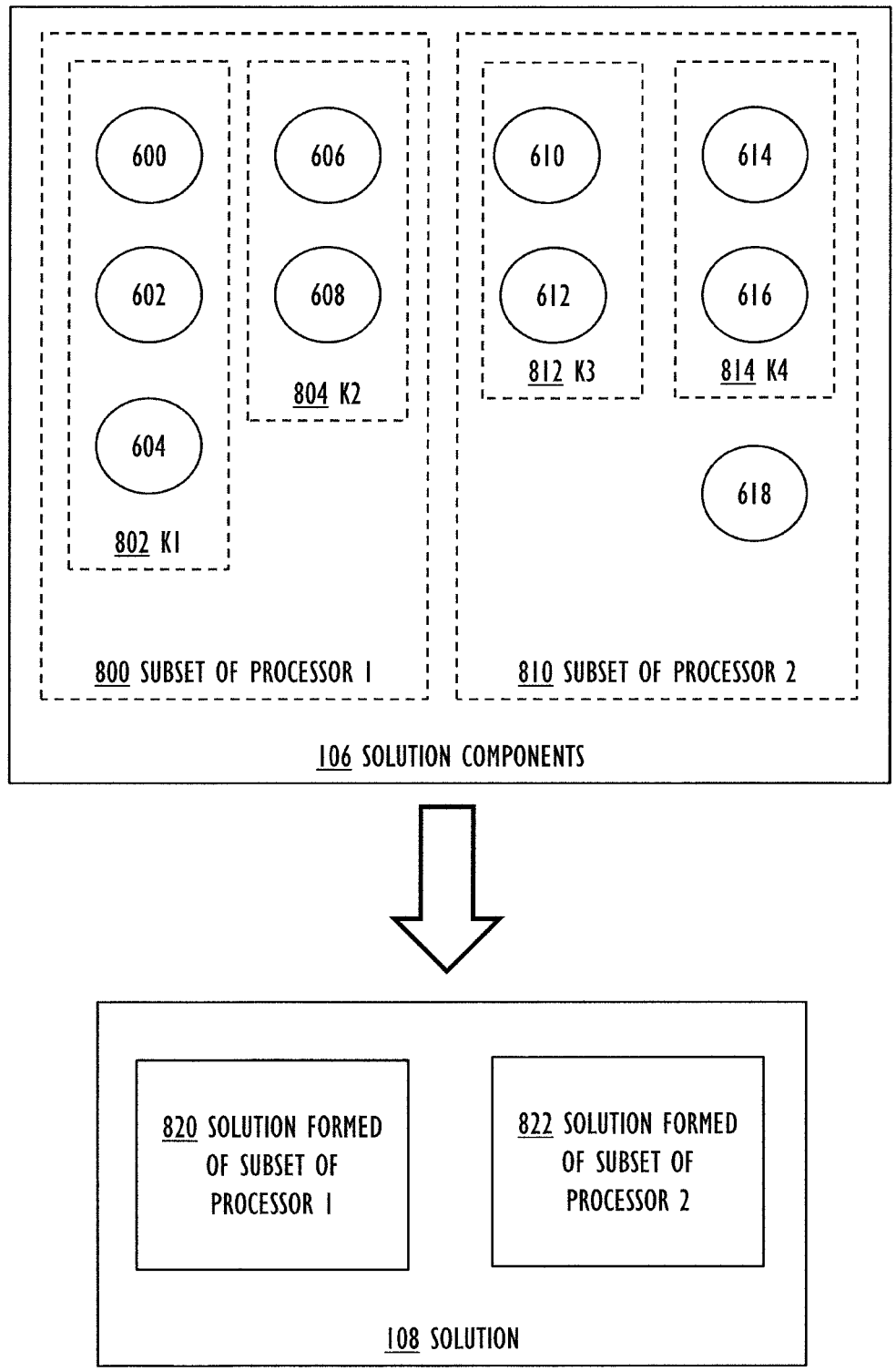

FIGS. 6, 7 and 8 show example embodiments of solution components 106 and a solution 108.

FIG. 6 has points 600, 602, 604, 606, 608, 610, 612, 614, 616, of which the solution components 106 are generated. The solution component K1 620 contains points 600, 602, and 604. The solution component K2 622 contains points 606, 608, and 610. The solution component K3 624 contains points 614 and 616. The solution component K4 626 contains points 606 and 612. As shown by FIG. 6, one point may belong to several solution components: in our example, point 606 belongs both to the solution component K2 622 and solution component K4 626. FIG. 6 also shows that not all the points need to belong in any solution component: in our example, the point 618 was not placed in any solution component (at this stage yet).

In an example embodiment, the solution program 114, 120, 126 additionally generates a solution 108 so that on each processor 110, 116, 122, the solution 108 is independently generated. According to FIG. 7, there may be a plurality of solutions 108: in our example, the solution 700 generated in the processor 1 110, and the solution 702 generated in the processor 2 116. Of these, the data processing apparatus 100 may automatically select one solution 700/702 by using a quality criterion. Alternatively, the user selects one of solutions 700/702, possibly supported by the data processing apparatus 100 so that the data processing apparatus 100 presents information on the solutions 700, 702 to the user according to at least one indicator.

In the example embodiment of FIG. 8, the component program 112, 118, 124 additionally divides the points 600, 602, 604, 606, 608, 610, 612, 614, 616, 618 to at least two processor-specific subsets 800, 810 and generates the solution components 802, 804, 812, 814 separately for each processor 110, 116, 122, and the solution program 114, 120, 126 additionally generates the solution 108 in such a manner that on each of the at least two processors 110, 116, 122 the solution 820, 822 is generated processor-specifically by the use of processor-specific solution components 802, 804, 812, 814 The data processing apparatus 100 then combines the generated solutions 820, 822 into the final solution 108.

The described method in which points 600-618 are used to generate solution components 620, 622, 624, 802, 804, 812, 814, of which the solution 108, 700, 702, 820, 822 is further generated may be applied to route optimization in logistics. The solution components that are built in the optimization of routes may be individual routes and/or parts thereof.

A second example embodiment relates to planning work shifts. A third example embodiment out of a plurality of possible applications relates to the planning of production, in other words, the distribution and allocation of tasks on various resources. This is possible to do by using mainly the same principles as those used for route optimization.

Next FIGS. 9A, 9B, 9C, 9D, 9E, 9F, 9G, 9H, 9I, 9J and 9K are examined, which show example embodiments of generating a solution 108 with regard to route optimization in logistics.

Figure 9A:
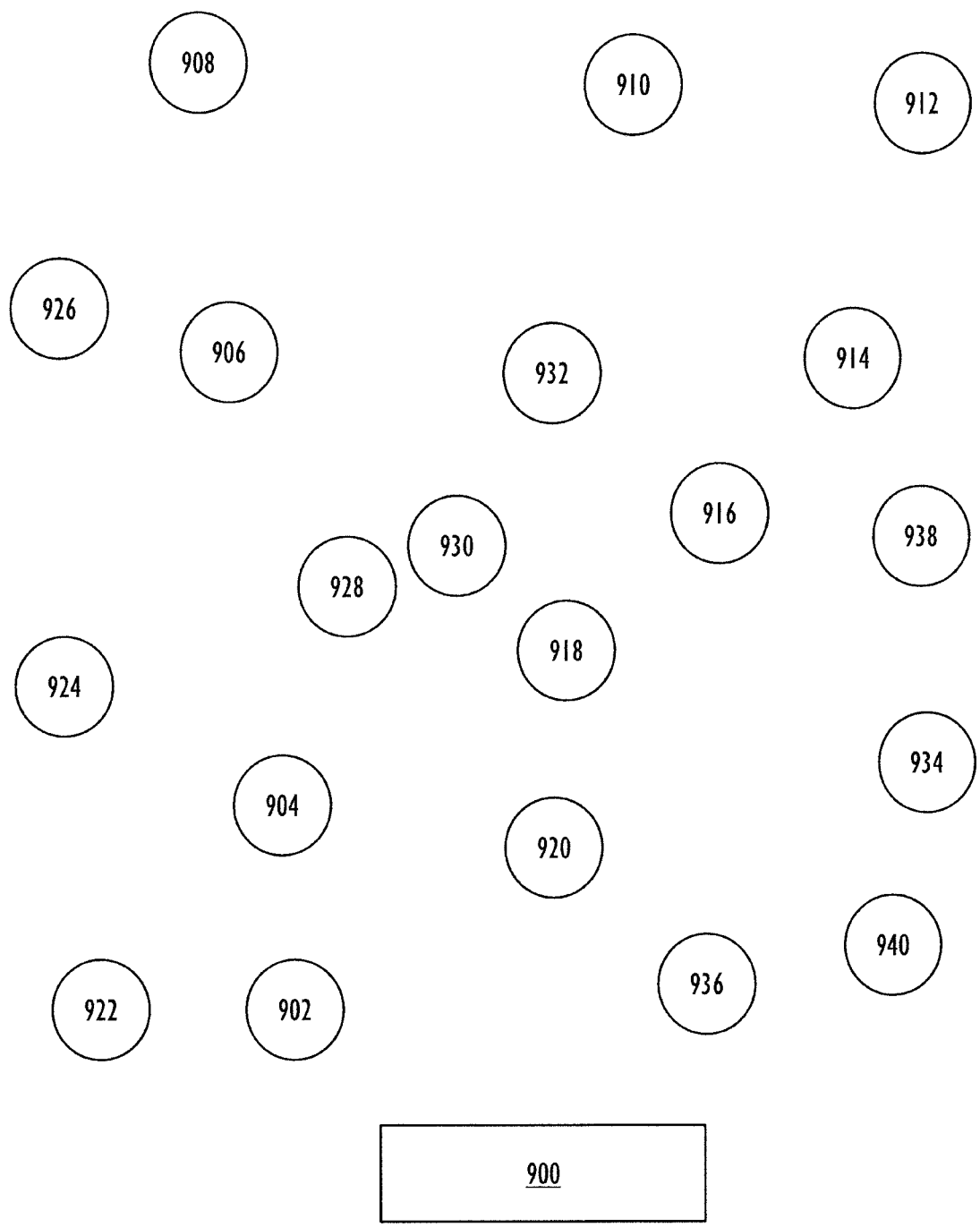
FIGS. 9A, 9B, 9C, 9D, 9E, 9F, 9G, 9H, 9I, 9J and 9K show an example embodiment of generating a solution.

In FIG. 9A, the rectangular element 900 is a node with which the solution components must be joined. In connection with route optimization, the node may be a terminal, depot, warehouse or the like, for example. In our example, there is only one node 900, but there could also be more of them. The solution components are generated of points 902-940 with component programs 112, 118, 124 run in parallel.

Figure 9B:
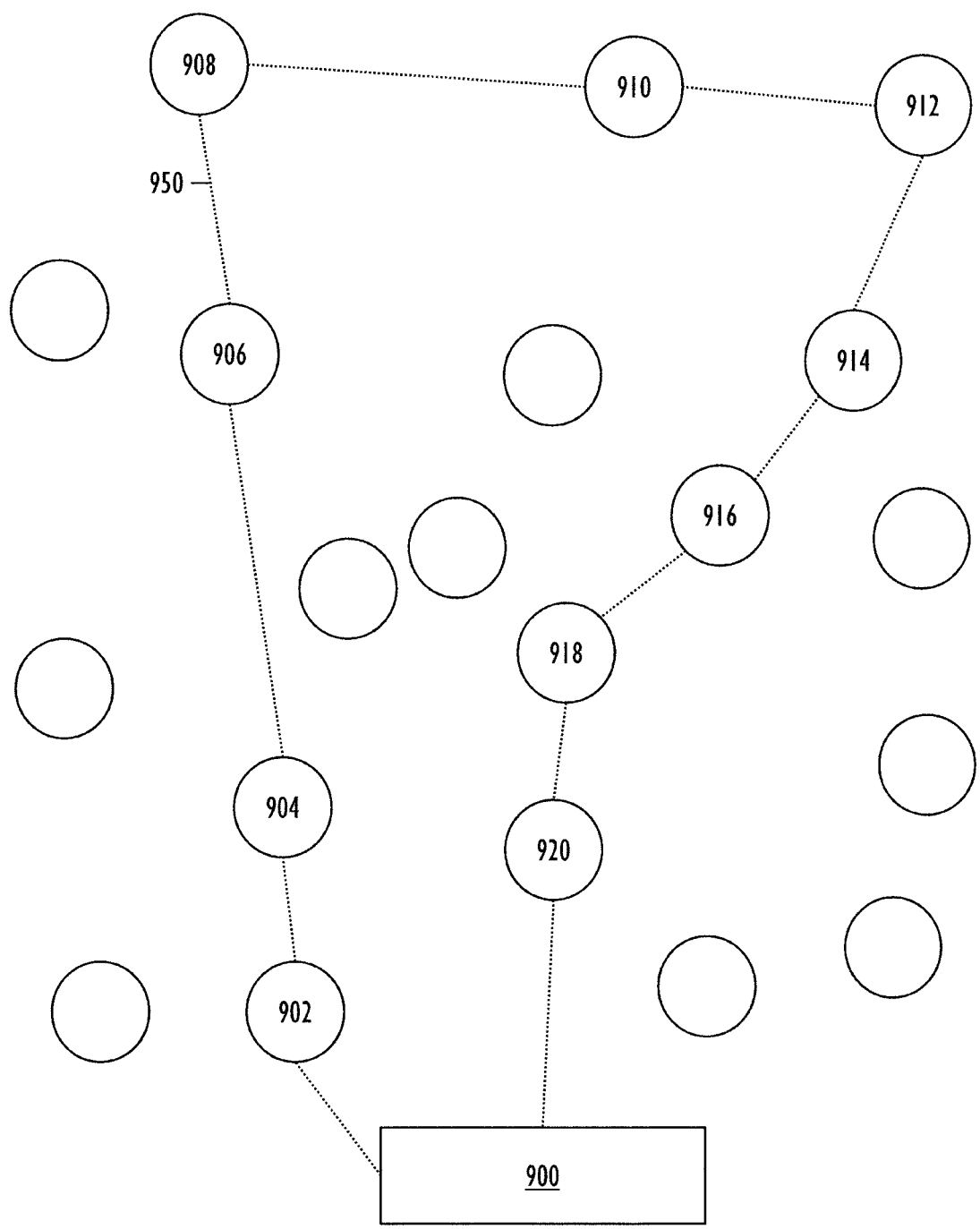

In FIG. 9B, a first solution component 950 has been generated, which contains points 902, 904, 906, 908, 910, 912, 914, 916, 918 and 920.

Figure 9C:
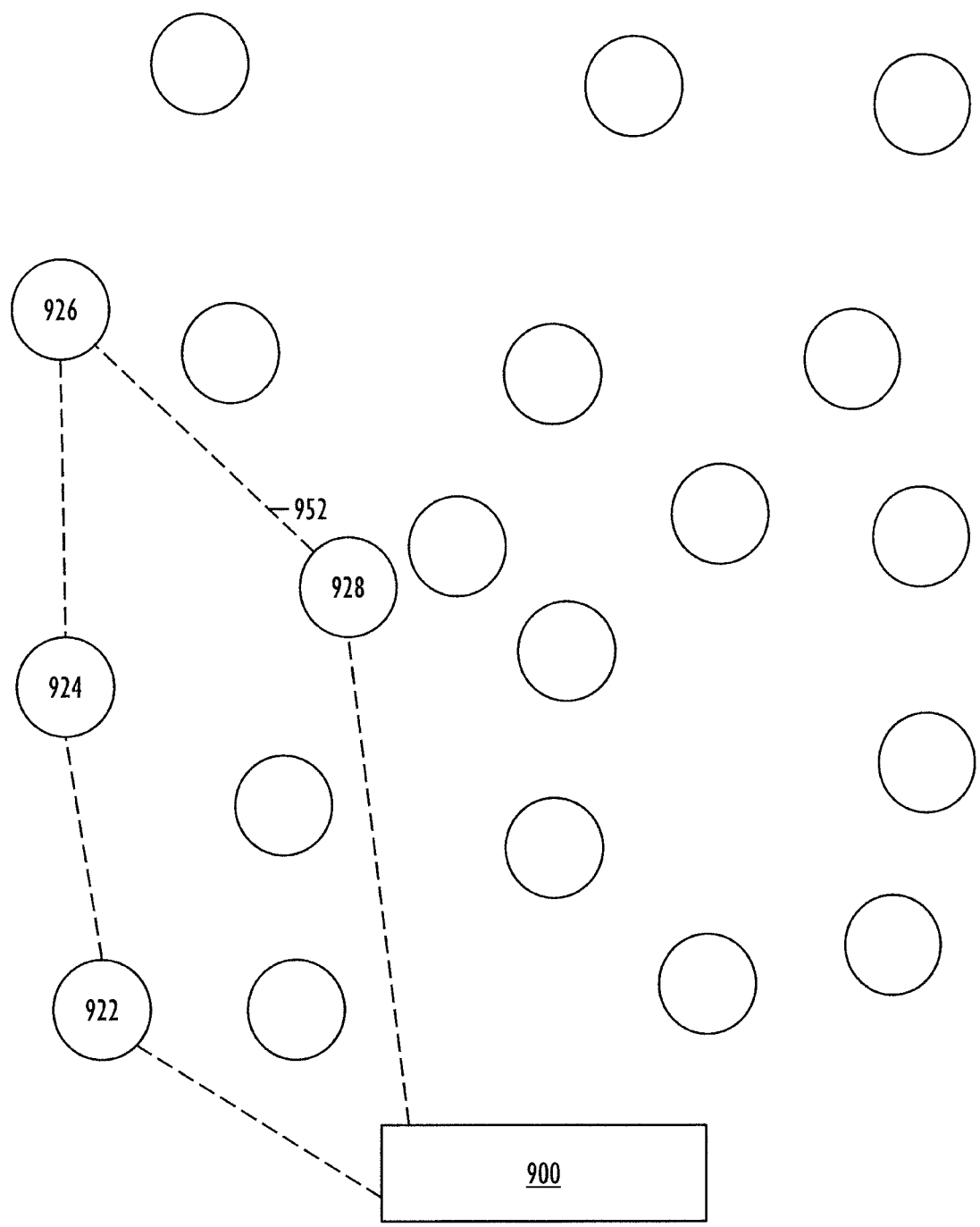

In FIG. 9C, a second solution component 952 has been generated, which contains points 922, 924, 926 and 928.

Figure 9D:
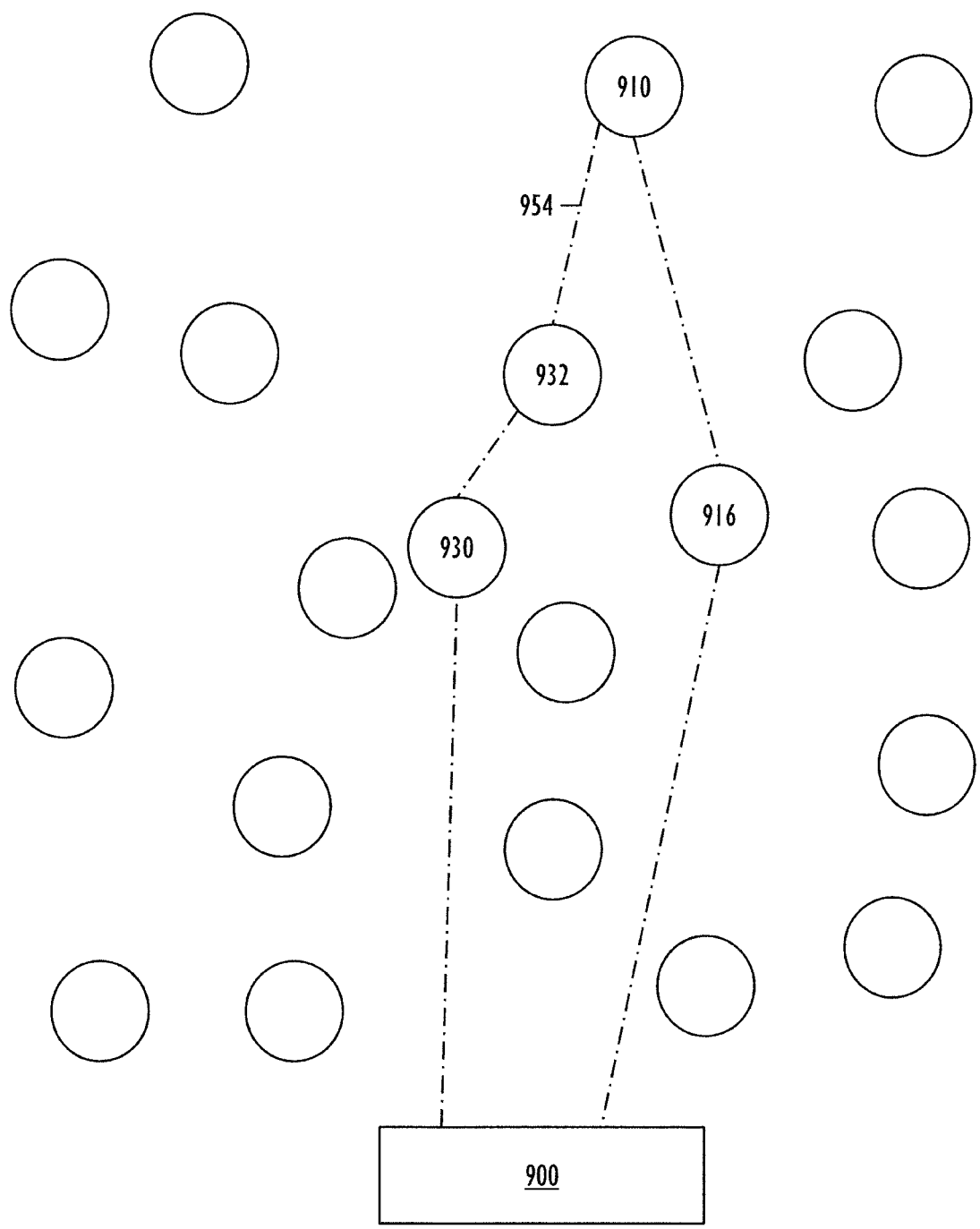

In FIG. 9D, a third solution component 954 has been generated, which contains points 930, 932, 910 and 916.

Figure 9E:
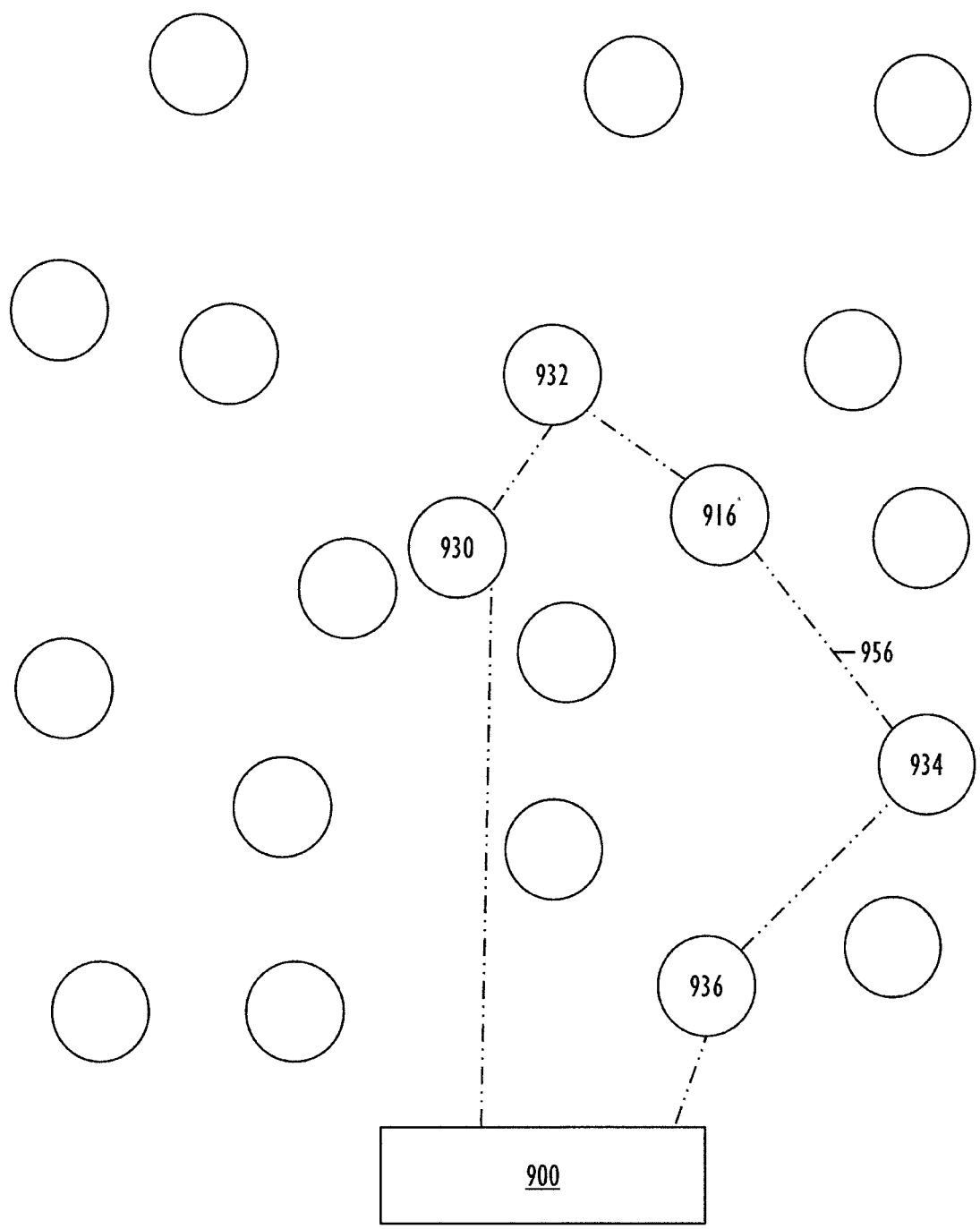

In FIG. 9E, a fourth solution component 956 has been generated, which contains points 930, 932, 916, 934 and 936.

Figure 9F:
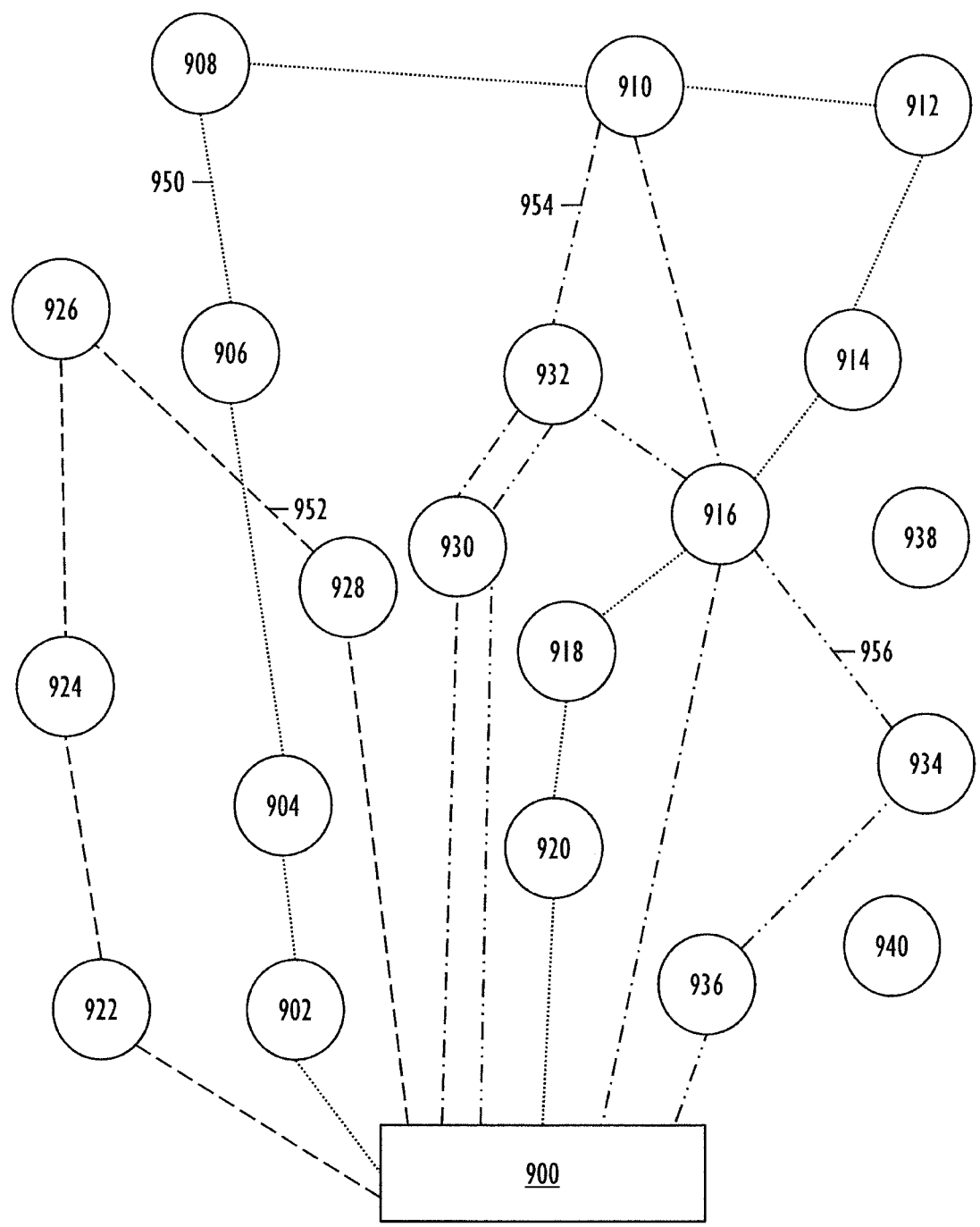

FIG. 9F describes the four solution components 950, 952, 954 and 956 generated with the component program 112.

Then, the generation of the solution 108 is begun with the solution programs 114, 120, 126 run in parallel.

Figure 9G:
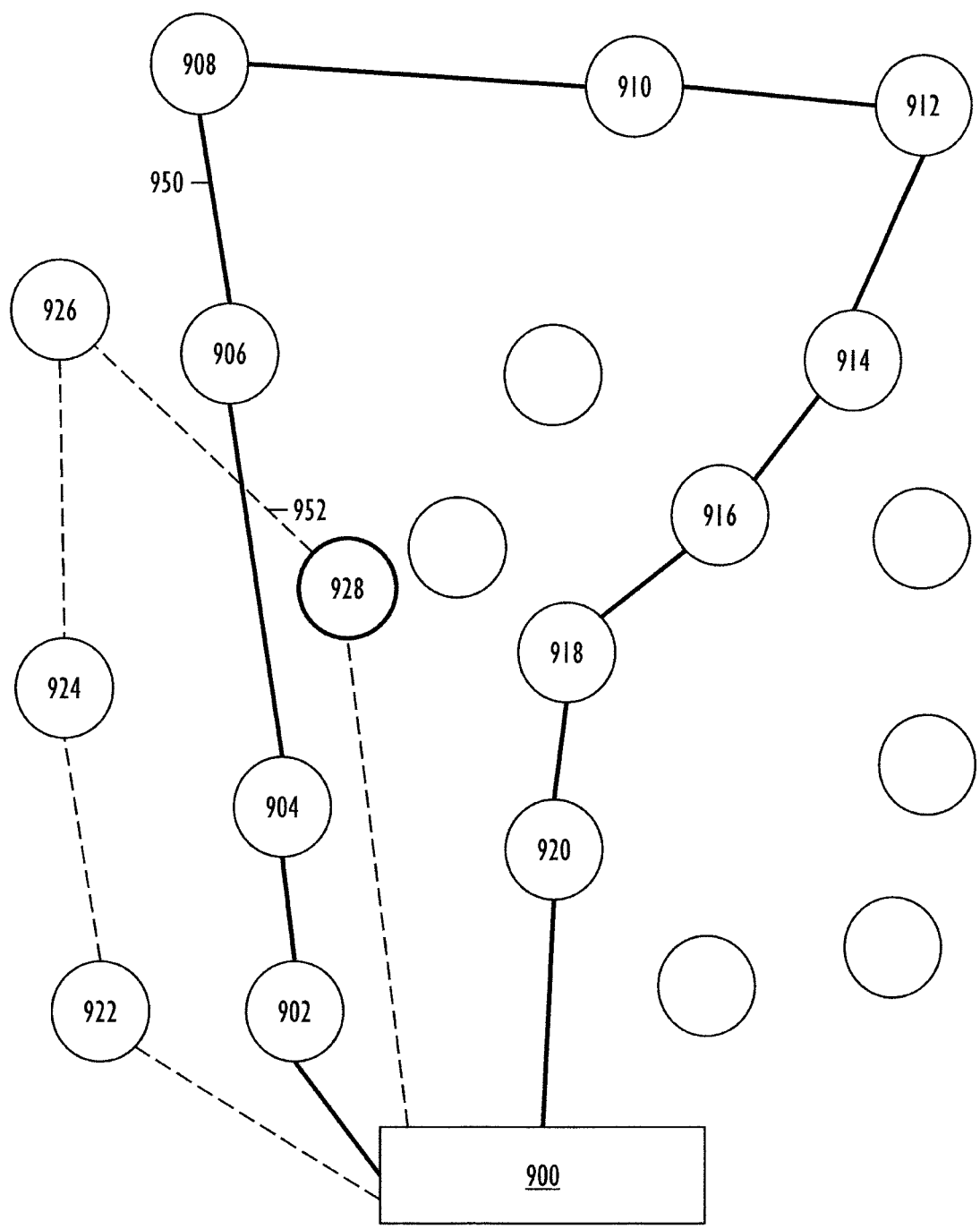

In FIG. 9G, a first solution component 950 has been selected. Once the first solution component 950 has been selected, a key point in relation to it is sought. In our example, the key point is defined as the closest point, that is, the point whose placing cost on the route in question would be the lowest. In this example embodiment, the point 928 is the first key point. After this, it is sought whether there is a route among the stored solution components 952, 954, 956, which includes the key point 928 but not a single overlapping point in relation to the previously selected solution components, so in this example, the first solution component 950. Such a solution component was found; this is the second solution component 952. In an example embodiment, the solution program 114, 120, 126 thus additionally selects, to the solution 108, the solution component 952 which has the best key point 928 and which has no overlaps with the solution components 950 already selected to the solution 108.

Figure 9H:
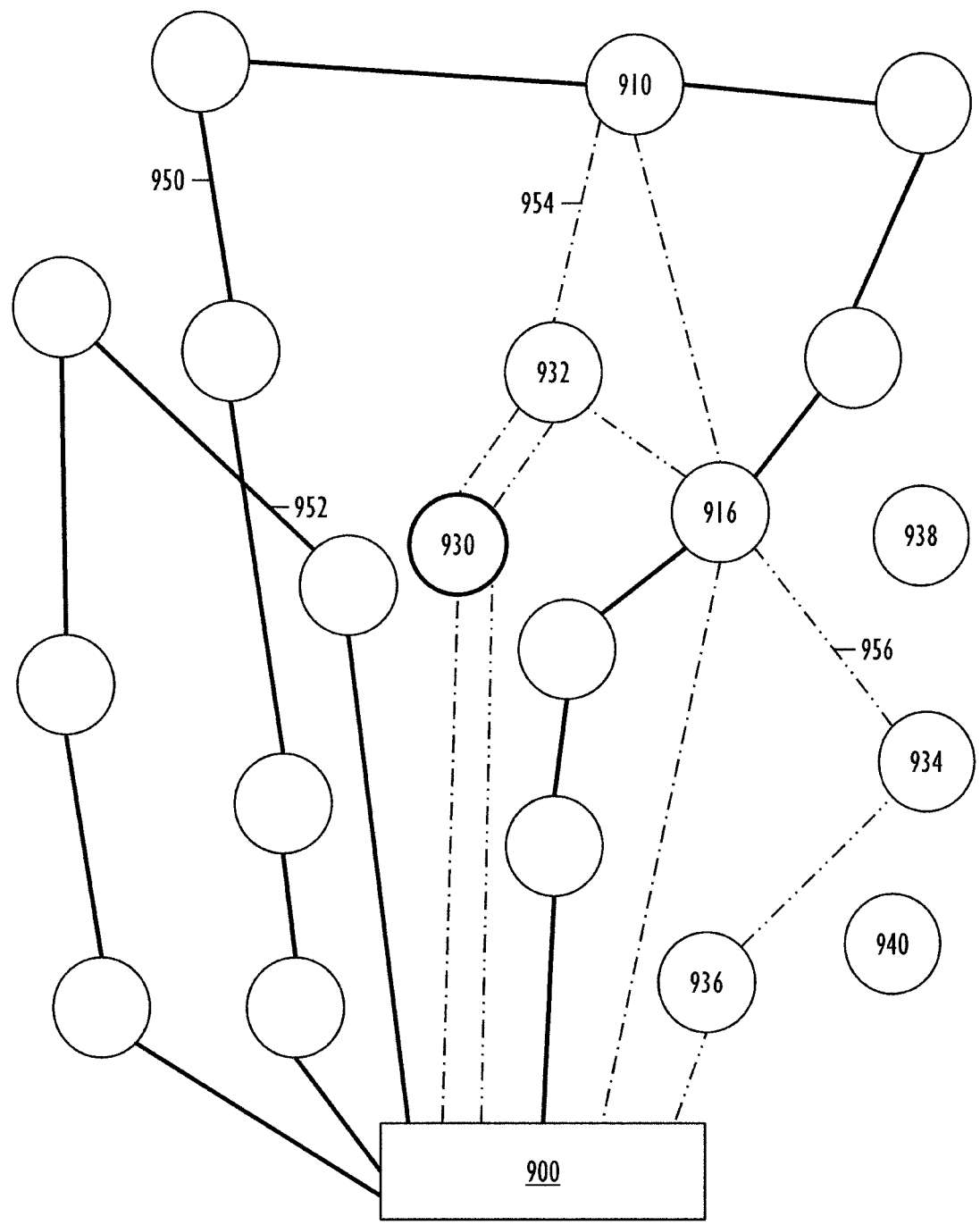

In FIG. 9H after this, the closest key point in relation to the first solution component 950, unselected up until now, is again sought. In this example embodiment, the point 930 is the next key point. After the identification of the key point 930, routes are again sought from the stored, still unused solution components 954, 956, which include the key point 930 and as few as possible overlapping points with the solution components 950, 952 already selected. Now, two solution components 954, 956 including the key point are found, but both have overlapping points with the solution components already selected, in this case, the solution component 950.

Figure 9I:
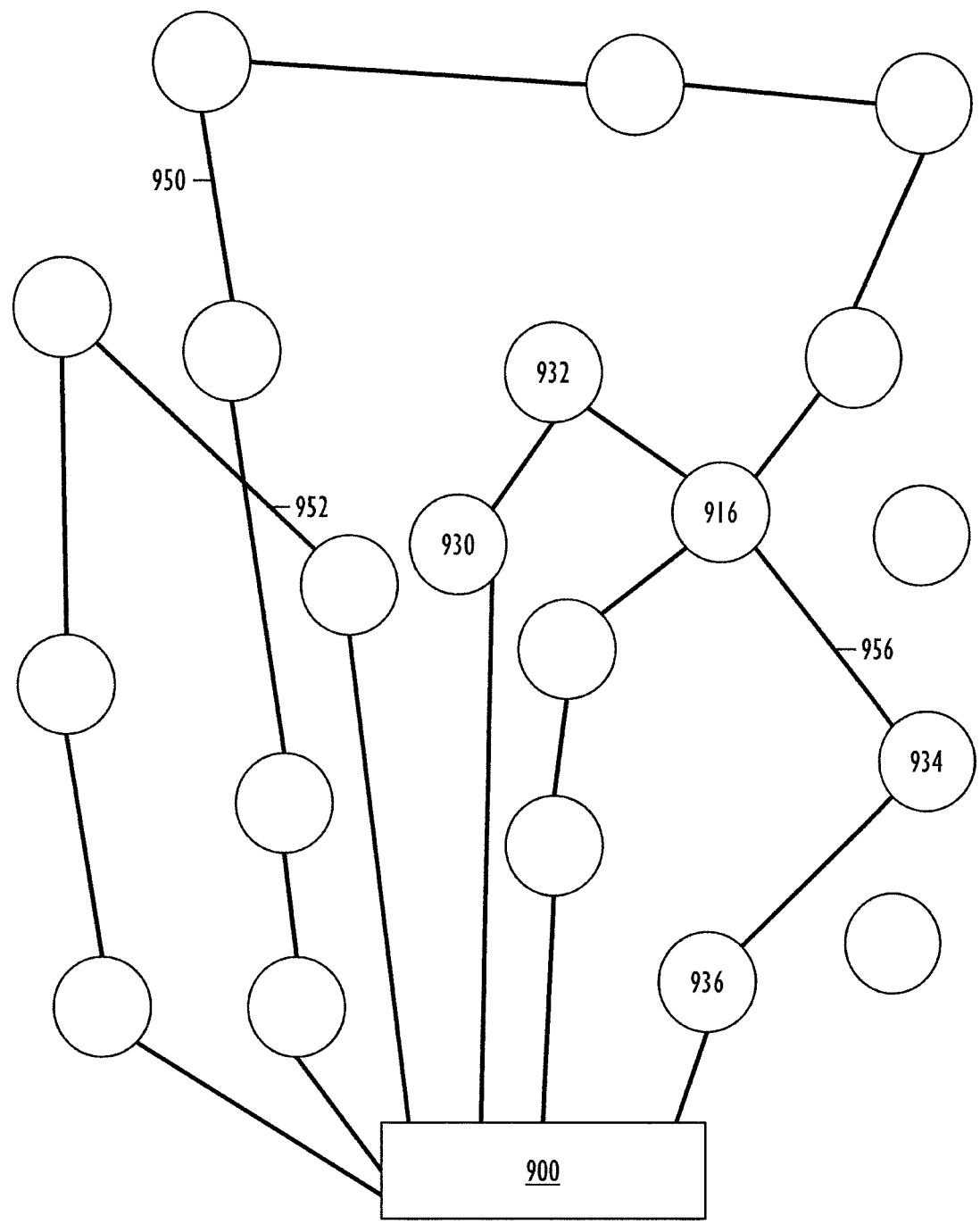

In accordance with FIG. 9I, the fourth solution component 956 is selected from the solution components 954, 956, because it has fewer overlapping points and its proportional length, taking into consideration the quantity of points and the length of the route, is better. Naturally, the selection criterion may also be different.

Figure 9J:
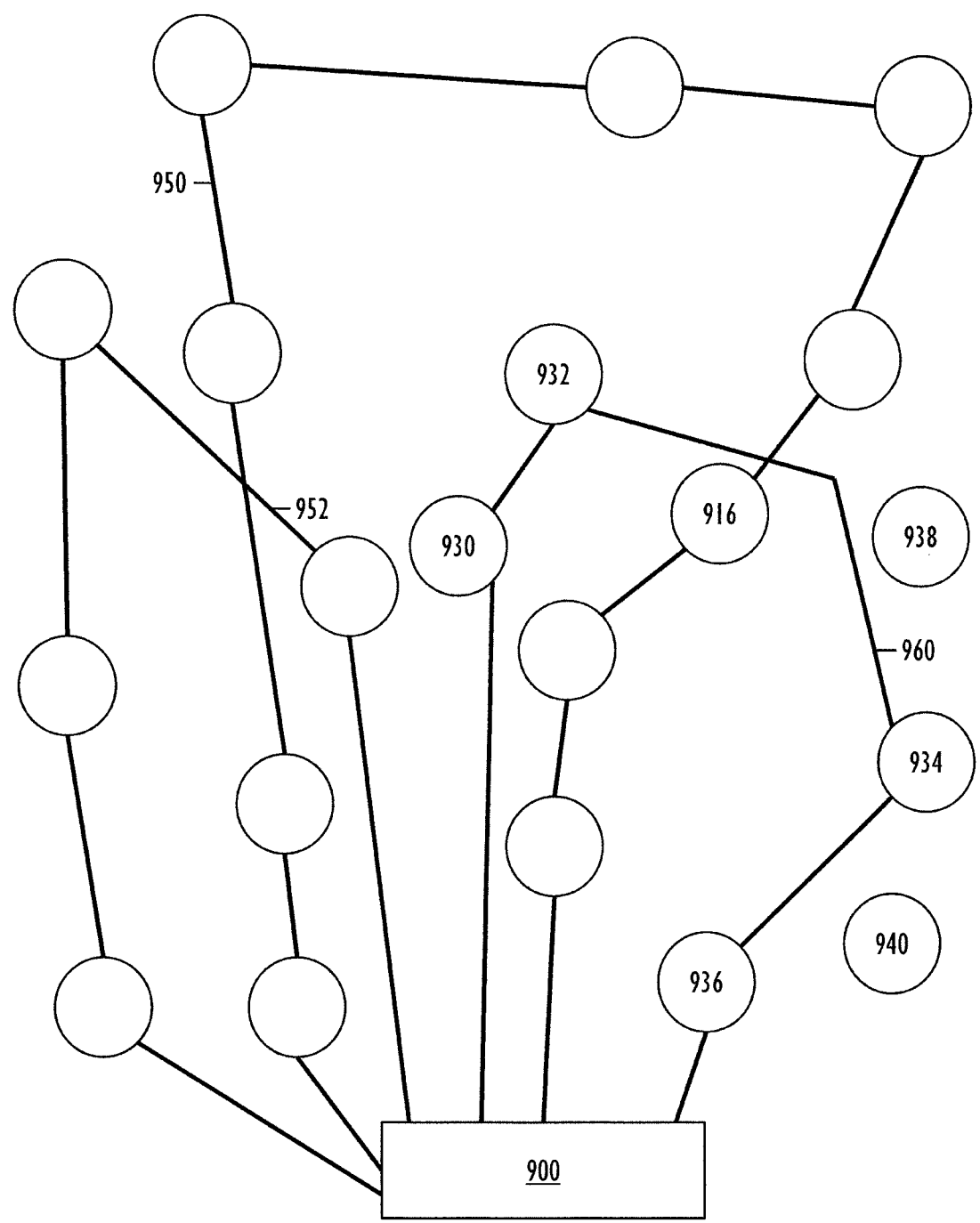

Then, the overlapping point 916 of the first solution component 950 and the fourth solution component 956 is removed from the route of the fourth solution component 956, after which the modified fourth solution component 960 is as shown in FIG. 9J.

In an example embodiment, the solution program 114, 120, 126 thus additionally selects, to the solution 108, the solution component 956 which includes the key point 930 but has overlaps with the solution components 950, 952 already selected for the solution 108, and which has the best efficiency value after the overlaps have been removed.

Finally, an effort is made to place the points 938 and 940 on the route 960 generated the last. This succeeds, whereby the result is a situation according to FIG. 9K, in which the final fourth solution component 962 consists of points 930, 932, 938, 934, 940 and 936. In principle, the search continues like this until all the points have been selected, or no more components including the key point can be found in the library of solution components.

In an example embodiment, the solution program 114, 120, 126 thus additionally places, after the removal of overlaps, individual solution points still unselected by that time in the solution components of the solution 108, which have already been selected, in our example points 938, 940 on the solution component 956 of which the solution component 962 is finally generated.

In addition, it is possible (not shown in FIGS. 9A-9K) that, in an embodiment, the solution program 114, 120, 126 additionally generates a dedicated solution component for such missing points of the solution 108, for which no solution component can be found and which cannot be placed in the solution components of the solution 108, which have already been selected.

Figure 9K:
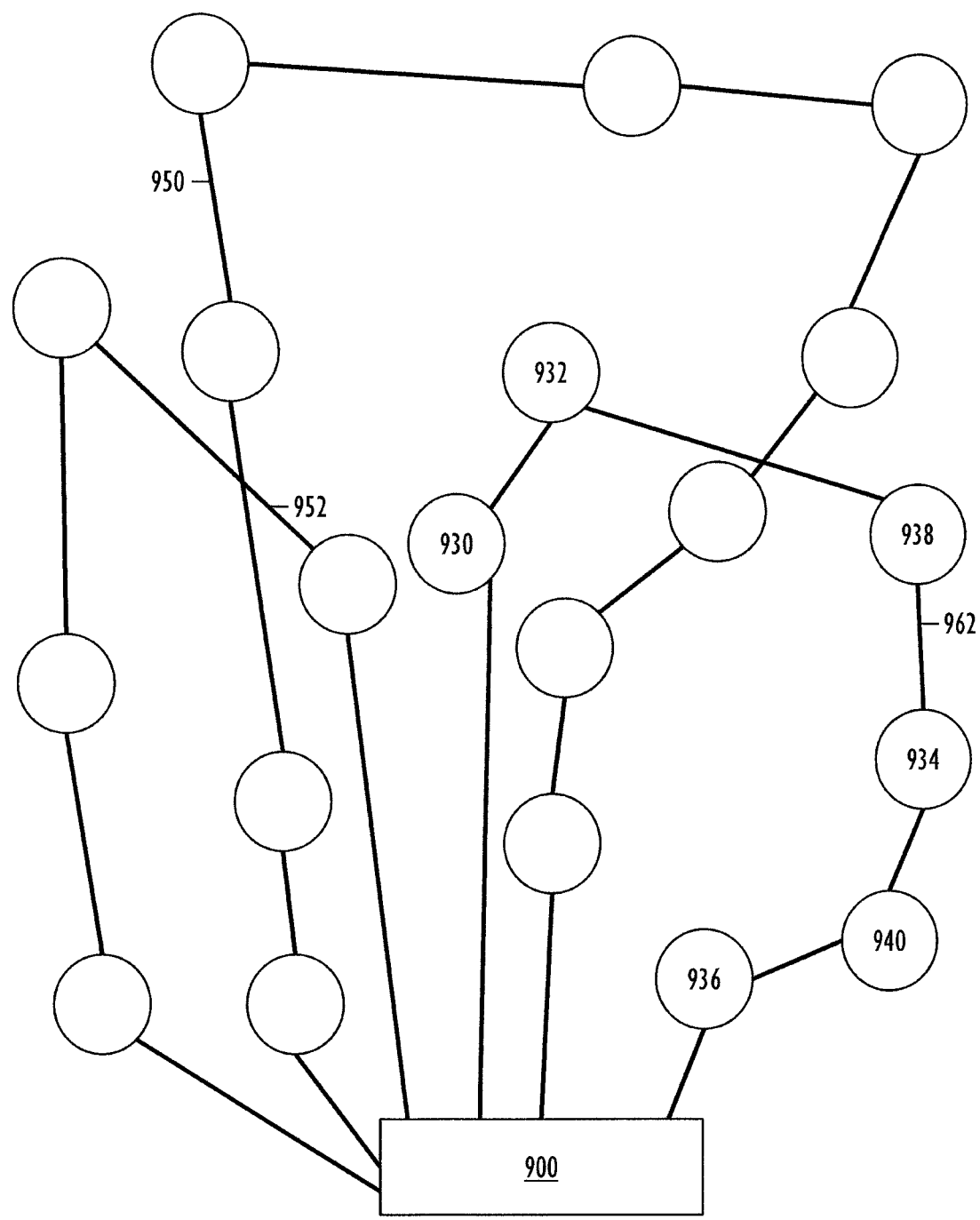

As shown by FIG. 9K, the final solution 108 is generated of the solution components 950, 952, and 962.

In the example embodiments of FIGS. 9A-9K, the application area of the program code 104 comprises route optimization in logistics, whereby
the solution components 950, 952, 954, 956 comprise individual routes and/or parts of individual routes;
the evaluation of the solutions 108 is based on at least one of the following: length of routes, capacity use of routes, total time of routes, fair allocation of routes, suitability of routes to time limits, compatibility of routes, priority of routes, but naturally many other criteria may be used;
the key points 928, 930 are obtained by defining unrouted points, in our example these were the closest unrouted points in relation to the first selected solution component;
corrections are based on the placing and/or changes of individual points; and
the combined solution 108 comprises a compatible set 950, 952, 962 of routes for a predetermined area and/or time period.

In another example embodiment, the application area of the computer program code 104 comprises the planning of work shifts, whereby
the solution components comprise individual work shifts and/or parts of individual work shifts;
the evaluation of the solutions is based on, for example, the quantity of unallocated tasks, quantity of overtime work, employees' needs, and/or fulfilling employees' wishes;
the key points are obtained by defining both temporally and regionally the closest point in relation to the points already selected;
corrections are based on the placing and/or changes of individual tasks; and
the combined solution comprises a compatible set of works shifts allocated to employees for predefined physical locations and/or time period.

A problem in planning work shifts is to group the points on such solution components 106 that the solution 108 can be compiled of them without having to re-calculate the costs at the combining stage. If different solution components 106 have work shifts of the same employee, it is checked at the combining stage that there is adequate time for rest between them and that the employee receives enough holiday and days off. This has three different paths: 1) If the solution components 106 are parts of work shifts, compatibility is checked at the combining stage. 2) Likewise, if work shifts are placed one after the other, their compatibility is checked at the combining stage. 3) The solution component 106 corresponds to one employee's actions during the selected time period, which in principle decreases the number of solution components, but on the other hand allows the distribution of the same parts of a whole among different processors 110, 116, whereby there will be adequate practical use for them.

In a third example embodiment, the application area of the computer program code 104 comprises the planning of production, whereby
the solution components comprise usage plans for individual machines;
the evaluation of the solutions is based on, for example, costs, reliability, or the utilization degree of the machines;
the key points are obtained on the basis of the similarity between the resource or time requirements of work tasks;
corrections are based on the variation of the timing and allocation of work tasks among different resources; and
the combined solution comprises a comprehensive production plan for a predetermined time period.

What is new in the example embodiments described is the combining of the solution components 106 in such a manner that during the combining stage corrective operations are carried out, including removals, additions, and replacements. What is new in addition to the above is the making of the combinations heuristically, leaning on the key points 928, 930 whereby it is not necessary to examine all the possible combinations. Due to the use of multiform corrections and key points 928, 930 the solution is not obvious. A novelty is also the making of the combining operations in parallel. The example embodiments solve the greatest problems, optimize challenging real-world problems faster, and improve the quality of the results.

Although set covering as an approach allows overlaps, and various kinds of correctional operators have been published in connection with the problem in question, a comprehensive approach in which both overlaps and missing points as well as their corrections are allowed in the combining of solution components 106 is not known. Such an approach, however, makes it possible to compile good solutions 108 effectively and in parallel, without the need to set up and maintain a vast base register in the memory 102.

Figure 10:
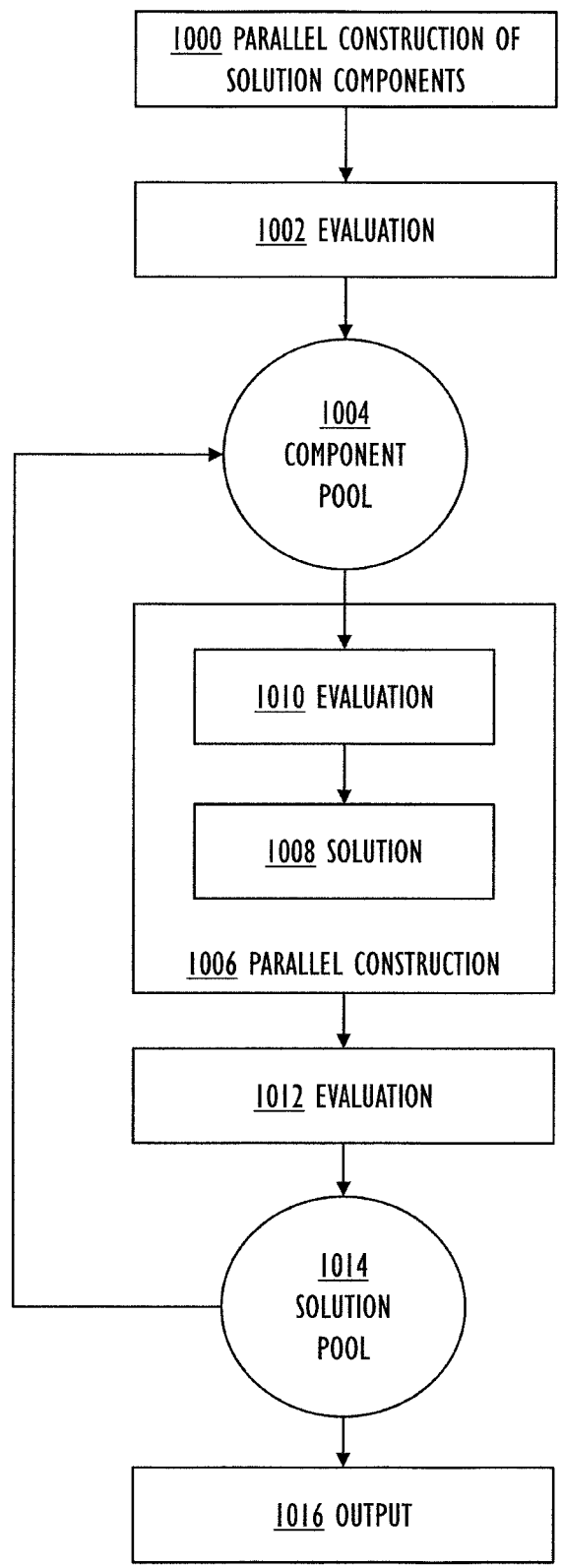
FIG. 10 shows an example embodiment of a data processing apparatus.

Lastly, FIG. 10 is examined, which shows an example embodiment of the data processing apparatus 100.

At first, a parallel construct 1000 of the solution components is carried out. The solution components 106 may be stored a compact data structure 1004 in a table, for example, that only has the information required from the viewpoint of describing the solution component. In the memory 102, only a limited set of compiled solution components 106 may be stored, for which the best efficiency value has been evaluated 1002. The definition of the efficiency value depends on the application, but as a general rule it depends on costs and the utilization degree of resources.

After this, each processor that is in use independently makes decisions 1008 from different starting points by adding components to the solution one at a time in parallel in the construct 1006. At each stage of adding, the solution component 106 is selected as the basis of the examinations, which has the best key point with respect to the components already selected at the evaluation 1010. This obviates going through all the combinations, and the search may be interrupted at early stages, if suitable solution components 106 to add cannot be found. The method adds into the set of selected ones solution components 106 containing a key point, which have no direct overlaps. This can be done, because the examination only contains good solution components 106, as regards their efficiency values. If there is no suitable solution component 106 in the stored set, the solution components 106 will first be examined, which include a key point, but at the same time also overlapping solution parts with the solution components 106 already selected. Of these, the solution component 106 is selected which has the best efficiency value after the overlaps have been removed. Because there will be room left in the solution components 106 after the overlaps have been removed, an effort is made to place individual parts of a solution, still unselected by that time, in the solution components 106 already selected to maximise power usage at each stage. If there are no solution components 106 containing a key point in the database 1004 being used, an effort is made to include other solution components 106. Finally, if no solution component 106 can be found for the missing parts of the solution 108, and they cannot be placed in the solution components 106 already selected, a solution component 106 of its own is set up for them. The correction method used is implemented so that it immediately sees which corrections and costs establish the compatibility, without performing the changes themselves. In practice, this takes place by separately listing the required changes after the corrections have been evaluated 1012. Lastly, the required quantity of the best solutions 1016 is returned. All the parts of the algorithm may be run in parallel, without waiting. The set 1014 of the best stored solution components may be expanded by the components of the best compiled total solutions.

The combining of the solution components 106 may be performed with different, alternative ways. For example, the selection of solution components 106 to be combined may be done in different ways, or a larger set of different combinations may be evaluated prior to the selection. The solution components 106 to be stored may be selected in various ways and they can be further divided into smaller parts. Additions may be done more solution components 106 at a time, and additions may be simultaneously done from a plurality of starting points. Corrections may be most diverse and varying. The method may also be self-learning, that is, concentrate first on expensive combinations, for example. Alternatively, it may identify at each stage the best solution component 106 to combine instead of the first suitable one, at the same time anticipating the effects of the selections made, if required, by a look ahead type of strategy. As part of compiling the solutions 108, it is also possible to carry out charges that improve the decision, with an improvement heuristics suitable for the purpose, for example. The selected and unselected solution components 106 of the solution may also be replaced to boost the search.

It will be apparent to a person skilled in the art that as technology advances, the basic idea of the invention may be implemented in many different ways. The invention and its embodiments are thus not restricted to the examples described above but may vary within the scope of the claims. In addition to the example embodiments described in the above, the same approach may in all likelihood be applied to at least two discrete optimizations with minor variations.

What is claimed is:

1. A data processing apparatus comprising a memory including a computer program code, and at least two processors which are configured to execute the computer program code, said computer program code comprising:
   a component program that forms solution components compiled of points from a total set of points, and stores the formed solution components in the memory; and
   a solution program that generates a solution by adding one solution component at a time, read from the memory, to the solution based on a key point, and stores the added solution component to the solution in the memory,
   wherein each solution component begins and ends at a node comprising a terminal, depot, or warehouse,
   wherein the solution indicates a route through the total set of points,
   wherein the key point is defined as a point that is the closest to any point within a set of previously selected solution components,
   wherein the solution program adds a subsequent solution component to the solution based at least in part on a determination that the subsequent solution component includes the key point,
   wherein the at least two processors comprise a plurality of N processors within a multicore central processing unit and an N+1 processor within a graphics processor on a separate graphics card,
   wherein the graphics card comprises its own memory in which the solution components are stored,
   wherein the component program is run in parallel on each of the N processors within the multicore central processing unit and the N+1 processor within the graphics processor, and
   wherein the solution program is run in parallel on each of the N processors within the multicore central processing unit and the N+1 processor within the graphics processor.

2. The data processing apparatus of claim 1, wherein a plurality of the solution components are added simultaneously from a plurality of starting points.

3. The data processing apparatus of claim 1, wherein the solution program identifies, at each stage, a best solution component to combine rather than identifying the first suitable solution component to combine while anticipating an effect of a selection made using a look-ahead strategy.

4. The data processing apparatus of claim 1, wherein the solution program is self-learning such that the solution program concentrates first on more expensive combinations of solution components.

5. The data processing apparatus of claim 1, wherein an application area of the computer program code comprises route optimization in logistics.

6. The data processing apparatus of claim 1, wherein the solution program adds the subsequent solution component to the solution based also on a determination that the subsequent solution component contains as few points within a set of previously selected points as possible.

7. The data processing apparatus of claim 1, wherein an evaluation of the solution is based at least in part on a length of the route, a capacity usage of the route, a total time of the route, or a suitability of the route to a time limit.

8. The data processing apparatus of claim 1, wherein a point overlapping between a first solution component and a second solution component is removed from the second solution component to create a modified second solution component.

9. The data processing apparatus of claim 1, wherein the solution comprises a compatible set of sub-routes for a predetermined area.

10. The data processing apparatus of claim 1, wherein selection of a starting point for each processor of the at least two processors is carried out with a random number.

11. A non-transitory computer-readable medium containing computer program code for execution by at least two processors, the computer program code comprising:
    a component program that forms solution components compiled of points from a total set of points, and stores the formed solution components in a memory; and
    a solution program that generates a solution by adding one solution component at a time, read from the memory, to the solution based on a key point, and stores the added solution component to the solution in the memory, wherein each solution component begins and ends at a terminal, depot, or warehouse, wherein the solution indicates a route through the total set of points, wherein the key point is defined as a point that is the closest to any point within a set of previously selected solution components, and wherein the solution program adds a subsequent solution component to the solution based at least in part on a determination that the subsequent solution component includes the key point, wherein the at least two processors comprise a plurality of N processors within a multicore central processing unit and an N+1 processor within a graphics processor on a separate graphics card, wherein the graphics card comprises its own memory in which the solution components are stored, wherein the component program is run in parallel on each of the N processors within the multicore central processing unit and the N+1 processor within the graphics processor, and wherein the solution program is run in parallel on each of the N processors within the multicore central processing unit and the N+1 processor within the graphics processor.

12. The computer-readable medium of claim 11, wherein a plurality of the solution components are added simultaneously from a plurality of starting points.

13. The computer-readable medium of claim 11, wherein the solution program identifies, at each stage, a best solution component to combine rather than identifying the first suitable solution component to combine while anticipating an effect of a selection made using a look-ahead strategy.

14. The computer-readable medium of claim 11, wherein the solution program is self-learning such that the solution program concentrates first on more expensive combinations of solution components.

15. The computer-readable medium of claim 11, wherein an application area of the computer program code comprises route optimization in logistics.

16. The computer-readable medium of claim 11, wherein the solution program adds the subsequent solution component to the solution based also on a determination that the subsequent solution component contains as few points within a set of previously selected points as possible.

17. The computer-readable medium of claim 11, wherein an evaluation of the solution is based at least in part on a length of the route, a capacity usage of the route, a total time of the route, or a suitability of the route to a time limit.

18. The computer-readable medium of claim 11, wherein a point overlapping between a first solution component and a second solution component is removed from the second solution component to create a modified second solution component.

19. The computer-readable medium of claim 11, wherein the solution comprises a compatible set of sub-routes for a predetermined area.

* * * * *